United States Patent
Pepe et al.

(10) Patent No.: US 8,122,713 B2
(45) Date of Patent: Feb. 28, 2012

(54) HYDRAULIC CIRCUIT OF A SERVO-ASSISTED MECHANICAL TRANSMISSION

(75) Inventors: Giovanni Pepe, Grottaglie (IT); Pasquale Palumbo, Vignola (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 684 days.

(21) Appl. No.: 12/324,117

(22) Filed: Nov. 26, 2008

(65) Prior Publication Data

US 2009/0142206 A1  Jun. 4, 2009

(30) Foreign Application Priority Data

Nov. 28, 2007  (EP) ..................... 07425751

(51) Int. Cl.
  *F16D 31/02* (2006.01)
  *F15B 7/06* (2006.01)
(52) U.S. Cl. ............... 60/478; 60/453; 60/584
(58) Field of Classification Search .............. 60/453, 60/478, 584, 585
  See application file for complete search history.

(56) References Cited

FOREIGN PATENT DOCUMENTS

| DE | 295 11 683 U1 | 9/1995 |
|---|---|---|
| DE | 100 52 666 A1 | 5/2002 |
| DE | 10 2004 054 725 A1 | 5/2006 |
| EP | 0 155 115 A2 | 9/1985 |

OTHER PUBLICATIONS

European Search Report mailed May 26, 2008, issued in EP 07425751.0.

*Primary Examiner* — Michael Leslie
(74) *Attorney, Agent, or Firm* — Venable LLP; Robert Kinberg; Leigh D. Thelen

(57) ABSTRACT

A hydraulic circuit of a servo-assisted mechanical transmission, which is provided with a number of hydraulic actuators provided with corresponding actuation chambers adapted to be filled with pressurized oil; the hydraulic circuit is provided with: a number of solenoid valves, each of which is coupled to a corresponding actuation chamber of a hydraulic actuator; a tank, which contains the oil at atmospheric pressure and is provided with an upper loading aperture; the cap, which closes the loading aperture of the tank and is provided with a through venting hole which puts the tank into communication with the external environment; a filtering element, which is coupled to the cap and is arranged under the venting hole; a hydraulic accumulator containing the pressurized oil; and an electric pump which draws from the tank and feeds the hydraulic accumulator.

7 Claims, 3 Drawing Sheets

HYDRAULIC CIRCUIT OF A SERVO-ASSISTED MECHANICAL TRANSMISSION

CROSS-REFERENCE TO RELATED APPLICATION

This application claims the priority of European Patent Application No: 07425751.0, filed on Nov. 28, 2007, the subject matter of which is incorporated herein by reference.

BACKGROUND OF THE INVENTION

The present invention relates to a hydraulic circuit for a servo-assisted mechanical transmission.

Servo-assisted mechanical transmissions, which are structurally similar to manual mechanical transmission of the traditional type except for the fact that the clutch pedal and the gear selection lever operated by the driver are replaced by corresponding electric or hydraulic servo-controls, are increasingly widespread.

The clutch servo-control is generally of the hydraulic type and comprises a single hydraulic actuator for displacing the clutch from the closing position to the opening position and vice versa. Generally, the gearbox servo-control is also of the hydraulic type and acts on a gearbox control shaft to impress on the control shaft itself both an axial displacement, i.e. along a central axis, and a rotation about the central axis; the two movements of the control shaft are necessary to engage and disengage each gear and to select the range of gears to be engaged. Consequently, the gearbox servo-control comprises a first hydraulic actuator mechanically coupled to the control shaft to axially displace the control shaft and a second hydraulic actuator mechanically coupled to the control shaft to rotate the control shaft.

Each hydraulic actuator comprises at least one actuation chamber delimited on one side by a mobile piston, which slides along the actuation chamber itself and is mechanically connected to the member to be controlled. The actuation chambers of the hydraulic actuators are connected to a hydraulic circuit, which for each actuation chamber comprises a three-way solenoid valve which is adapted either to connect the actuation chamber to a hydraulic accumulator containing pressurized oil, or to connect the actuation chamber to a tank containing oil at atmospheric pressure, or to maintain the actuation chamber isolated.

In order to allow the operation of the system, the tank containing oil at atmospheric pressure must be pneumatically connected to the external environment, because it must aspirate air from the external environment when the electric pump aspirates oil and must introduce air into the external environment when the oil is discharged from the actuation chambers of the hydraulic actuators. Currently, the most common solution for pneumatically connecting the tank and the external environment is to obtain a through venting hole in a screw-on cap which closes a loading aperture of the tank; the loading aperture is used to initially fill the tank (and thus the hydraulic circuit connected to the tank) and for possibly topping up the oil present in the tank.

It has been observed that in the currently manufactured hydraulic circuits, oil may leak through the tank cap venting hole and drip into the engine compartment soiling the engine compartment itself. Furthermore, it has been observed that in the currently manufactured hydraulic circuits, impurities (typically dust and the like) may be aspirated into the tank through the tank cap venting hole and pollute the oil in the tank; such impurities are however blocked by the filter upstream of the electrical pump, but in the long run may cause an obstruction of such a filter determining a localized increase of the load losses with consequent overloading of the electric pump.

SUMMARY OF THE INVENTION

It is the object of the present invention to make a hydraulic circuit of a servo-assisted mechanical transmission, such hydraulic circuit being free from the above-described drawbacks and, specifically, being easy and cost-effective to implement.

According to the present invention, a hydraulic circuit of a servo-assisted mechanical transmission is provided as claimed in the attached claims.

BRIEF DESCRIPTION OF THE DRAWINGS

The present invention will now be described with reference to the accompanying drawings, which disclose a non-limitative embodiment thereof, in which.

DETAILED DESCRIPTION

Figure 1:
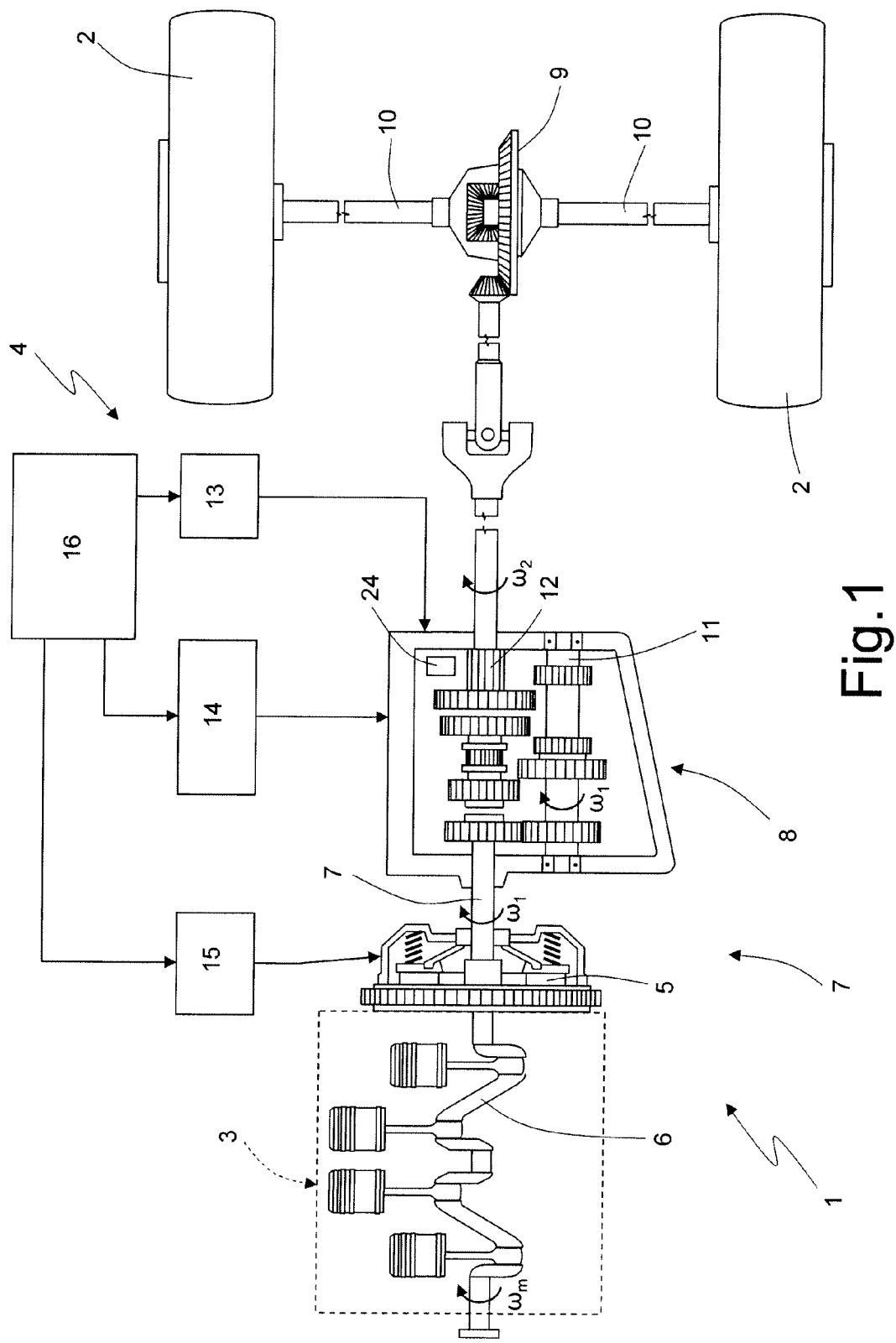
FIG. 1 is a diagrammatic view of a vehicle provided with a servo-assisted mechanical transmission provided with a hydraulic circuit made according to the present invention.

In FIG. 1, numeral 1 indicates as a whole a car provided with two front wheels (not shown) and two rear drive wheels 2 which receive the torque generated by an internal combustion engine 3 by means of a servo-assisted transmission 4. The servo-assisted transmission 4 comprises a servo-assisted clutch 5, which is accommodated in a bell integral with the engine 3 and is adapted to connect a drive shaft 6 of the engine 3 to a propeller shaft 7 ending in a servo-assisted mechanical gearbox 8. A differential 9, from where a pair of axle shafts 10 departs, each of which integral with a corresponding rear drive wheel 2, is arranged in cascade to the servo-assisted gearbox 8.

The servo-assisted gearbox 8 comprises a primary shaft 11, which rotates at an angular speed $\omega_1$, and a secondary shaft 12, which rotates at an angular speed $\omega_2$ and transmits the motion to the rear drive wheels 2 by means of the differential 9 and the pair of axle shafts 10. The servo-assisted gearbox 8 is actuated by a hydraulic actuator 13 to engage/disengage a gear and by a hydraulic actuator 14 for selecting the gear range. By means of the interposition of the servo-assisted clutch 5, which is operated by a hydraulic actuator 15, the primary shaft 11 is connected to the drive shaft 6, which is rotated by the engine 3 and rotates at an angular speed $\omega_m$.

The car 1 comprises an electronic control unit 16 (diagrammatically shown), which controls the servo-assisted transmission 4 and, among other tasks, drives the hydraulic actuators 13 and 14 of the servo-assisted gearbox 8 and the hydraulic actuator 15 of the servo-assisted clutch 5.

Figure 2:
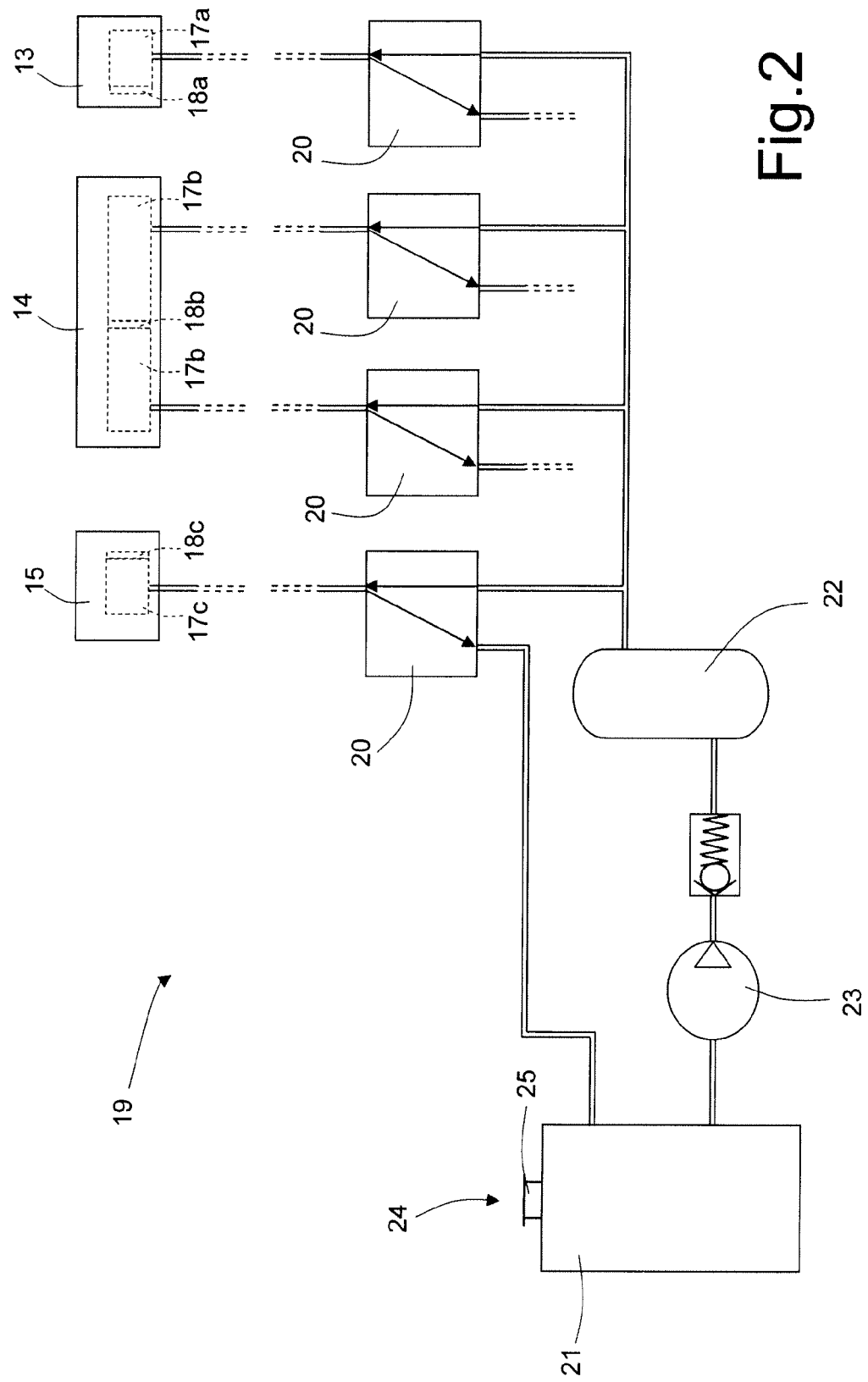
FIG. 2 is a diagrammatic view of the hydraulic circuit of the servo-assisted mechanical transmission in FIG. 1.

As shown in FIG. 2, the hydraulic actuator 13 is single-acting and comprises a single actuation chamber 17a, which is adapted to be filled with pressurized oil (which constitutes a control fluid of the hydraulic actuator 13) and is delimited by a sliding piston 18a mechanically connected to the servo-assisted gearbox 8. The hydraulic actuator is single-acting 13, i.e. capable of generating a hydraulic push in a single direction on the piston 18a; consequently, the hydraulic actuator 13 also comprises a spring (not shown) adapted to generate an elastic push opposite to the hydraulic push.

The hydraulic actuator 14 is double-acting and comprises two actuation chambers 17b, which are adapted to be alternatively filled with pressurized oil (which constitutes a control fluid of the hydraulic actuator 14), are arranged side-by-side and are separated by a sliding piston 18b mechanically connected to the servo-assisted gearbox 8. The hydraulic actuator 14 is double-acting, i.e. capable of generating a hydraulic push in two opposite directions on the piston 18b; consequently, the hydraulic actuator 14 does not have any spring.

The hydraulic actuator 15 is single-acting and comprises a single actuation chamber 17c, which is adapted to be filled with pressurized oil (which constitutes a control fluid of the hydraulic actuator 15) and is delimited by a sliding piston 18a mechanically connected to the servo-assisted clutch 5. The hydraulic actuator 15 is single-acting, i.e. capable of generating a hydraulic push in a single direction on the piston 18c; consequently, the hydraulic actuator 15 also comprises a spring (not shown) adapted to generate an elastic push opposite to the hydraulic push.

The hydraulic actuators 13, 14 and 15 of the servo-assisted transmission 4 are connected to a hydraulic circuit 19 which comprises a corresponding three-way solenoid valve 20 driven by the electronic control unit 16 for each actuation chamber 17. Furthermore, the hydraulic circuit 19 comprises a tank 21 containing the oil at atmospheric pressure, a hydraulic accumulator 22 containing the pressurized oil, and an electric pump 23 which draws from the tank 21 and feeds the hydraulic accumulator 22. Each three-way solenoid valve 20 is capable of maintaining the corresponding actuation chamber 17 isolated to maintain the oil pressure in the actuation chamber 17 constant, is capable of connecting the actuation chamber 17 to the tank 21 for reducing pressure P of the oil in the actuation chamber 17, and is adapted to connect the actuation chamber 17 to the hydraulic accumulator 22 to increase the pressure of the oil in the actuation chamber 17.

The tank 21 has an upper loading aperture 24, which is used for the initial filling of the tank 21 (and thus of the hydraulic circuit 19 connected to the tank 21) and possibly topping up the oil inside the tank 21, and is normally closed by a screwed-on cap 25.

In order to allow the operation of the hydraulic circuit 19, the tank 21 containing oil at atmospheric pressure must be pneumatically connected to the external environment, because it must aspirate air from the external environment when the electric pump 23 aspirates the oil and must introduce air into the external environment when the oil is discharged from the actuation chambers 17 of the hydraulic actuators 13, 14 and 15.

Figure 3:
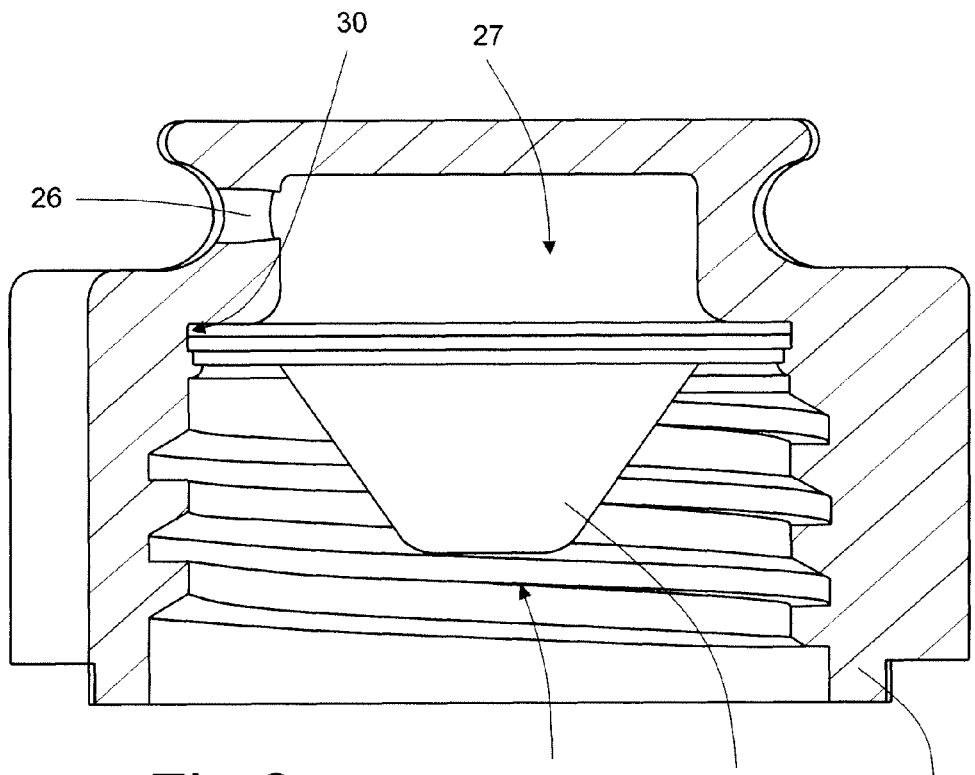
FIG. 3 is a diagrammatic, side section view of a tank cap of the hydraulic circuit in FIG. 2.

As shown in FIG. 3, the cap 25 laterally has a through venting hole 26, which puts the tank 21 into communication with the external environment. A filtering element 27 is coupled to the cap 25, which is arranged under the venting hole 26, displays a circular shape and is fixed to the cap 25.

Figure 4:
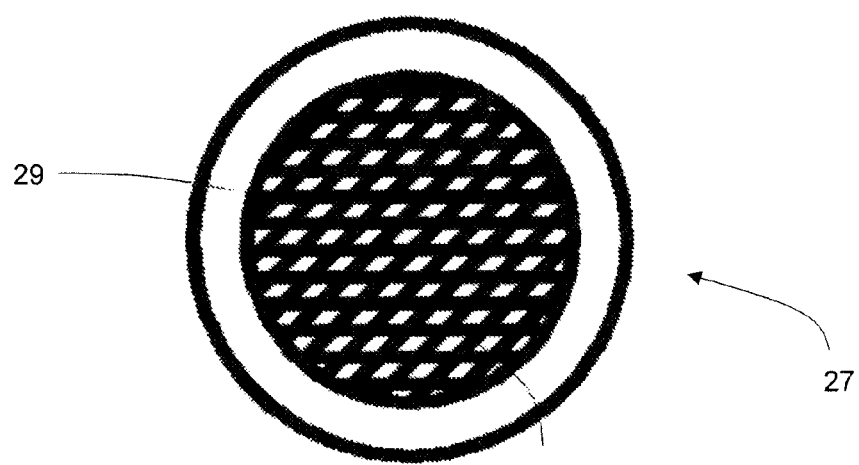
FIG. 4 is a plan view of a membrane coupled to the cap in FIG. 2.

As shown in FIG. 4, the filtering element 27 consists of a central membrane 28 having the function of filtering the air, which enters and exits through the venting hole 26, and a ring-shaped support 29, which surrounds the membrane 28, is integral with the membrane 28 itself and has the function of establishing the mechanical connection with the cap 25. Preferably, the membrane 28 is made of air-permeable material and specifically GoreTex®, which has the advantage of resisting to high temperatures (in the order of 140° C.-160° C.) without decaying.

As shown in FIG. 3, the filtering element 27 is snapping locked into a ring-shaped seat 30 obtained under the venting hole 26 and immediately over the internal threaded portion; in order to be inserted in the ring-shaped seat 30, the filtering element 27 must be elastically deformed, in this manner the stability of the mechanical connection between the filtering element 27 and the cap 25 is ensured.

According to the embodiment shown in FIG. 3, an anti-splash bowl 31 is also coupled to the cap 25, which is arranged under the filtering element 27, has an inverted frustum-conical shape (i.e. with the wider part facing upwards and the narrower part facing downwards) and is centrally hollow to define an air passage 32 from/to the venting hole 26. Preferably, the filtering element 27 is glued to the anti-splash bowl 31 and then the anti-splash bowl 31 along with the filtering element 27 is snappingly locked into a ring-shaped seat 30. According to a different embodiment (not shown), the anti-splash bowl 31 is not present.

In virtue of the presence of the filtering element 27, it is possible to avoid both the leakage of oil from the venting hole 26, and the entrance of impurities into the tank 21 through the venting hole 26. Indeed, when the air is ejected from the tank 21 through the venting hole 26 (i.e. when the oil is discharged from the actuation chambers 17 to the tank 21), the filtering element 27 withholds the oil particles in the tank 21 which could otherwise leak out through the venting hole 26. Furthermore, when the air is aspirated into the tank 21 through the venting hole 26 (i.e. when the electric pump 23 aspirates oil from the tank 21), possible impurities which could enter the cap 25 through the venting hole 26 are blocked by the filtering element 27 and therefore do not come into contact with the oil contained in the tank 21.

It is important to observe that in virtue of its position, the filtering element 27 is subjected to periodical "automatic" cleaning, because possible deposits of impurities on the external wall of the filtering element 27 are pushed out from the cap 25 through the venting hole 26 when the air is ejected from the tank 21 through the venting hole 26 itself (i.e. when the oil is discharged from the actuation chambers 17 to the tank 21).

Finally, the coupling of the filtering element 27 to the cap 25 is extremely simple and cost-effective, because it does not imply any change to the shape and/or to the size of the cap 25.

The invention claimed is:

1. A hydraulic circuit of a servo-assisted mechanical transmission, which is provided with a number of hydraulic actuators provided with corresponding actuation chambers adapted to be filled with pressurized oil; the hydraulic circuit comprises:
   a number of solenoid valves, each of which is coupled to a corresponding actuation chamber of a hydraulic actuator;
   a tank, which contains the oil at atmospheric pressure and is provided with an upper loading aperture;
   a cap, which closes the loading aperture of the tank and is provided with a through venting hole which puts the tank into communication with the external environment;
   a hydraulic accumulator containing the pressurized oil;
   an electric pump which draws from the tank and feeds the hydraulic accumulator;
   a filtering element, which is coupled to the cap and is arranged under the venting hole; and
   an anti-splash bowl, which is coupled to the cap and is arranged under the filtering element so as to protrude inside the tank from the filtering element, wherein the anti-splash bowl has an inverted frustum-conical shape, including a wider part that faces upwards to be connected to the filtering element and a narrower part that faces downwards inside the tank, and is centrally hollow to define a passage for the air to and/or from the venting hole.

2. A hydraulic circuit according to claim 1, wherein the filtering element comprises a central membrane having the function of filtering the air which enters and exits through the venting hole.

3. A hydraulic circuit according to claim 2, wherein the filtering element comprises a ring-shaped support, which surrounds the membrane, is integral with the membrane itself and has the function of establishing the mechanical connection with the cap.

4. A hydraulic circuit according to claim 2, wherein the membrane is made of air-permeable fabric.

5. A hydraulic circuit according to claim 4, wherein the membrane is made of GoreTex®.

6. A hydraulic circuit according to claim 1, wherein the cap has a ring-shaped seat obtained under the venting hole; the filtering element is snappingly locked into the ring-shaped seat.

7. A hydraulic circuit according to claim 1, wherein the filtering element is glued to the anti-splash bowl.

* * * * *